United States Patent [19]

Weaver

[11] Patent Number: 4,756,172

[45] Date of Patent: Jul. 12, 1988

[54] TRAILER LOCK

[75] Inventor: Marcus S. Weaver, Trumann, Ark.

[73] Assignee: Robert Welborn Hightower, Trumann, Ark. ; a part interest

[21] Appl. No.: 70,217

[22] Filed: Jul. 6, 1987

[51] Int. Cl.$^4$ .............................................. E05B 73/00
[52] U.S. Cl. ............................................ 70/58; 70/234
[58] Field of Search ................. 70/58, 57, 14, 234, 70/258; 280/507, 511; 248/352

[56] References Cited

U.S. PATENT DOCUMENTS

| 3,233,913 | 2/1966 | Brown . | |
| 3,605,457 | 9/1971 | Foster . | |
| 3,797,283 | 3/1974 | Honer | 70/58 |
| 3,822,900 | 7/1974 | Peterson . | |
| 3,857,575 | 12/1974 | Lee . | |
| 4,141,569 | 2/1979 | Dilk | 280/507 |
| 4,459,832 | 7/1984 | Avrea | 70/14 |
| 4,548,418 | 10/1985 | Wendorff | 280/507 |
| 4,571,964 | 2/1986 | Bratzler . | |

Primary Examiner—Robert L. Wolfe
Attorney, Agent, or Firm—Fleit, Jacobson, Cohn & Price

[57] ABSTRACT

A trailer lock and more specifically to an anti-theft device for use with boat trailers or other trailers having a tongue with a ball socket thereon for engagement with a hitch ball connected to a towing vehicle. The lock includes a hitch ball mounted on top of a vertically adjustable support stand with the ball being received in the ball socket on the trailer tongue. The support stand includes a pivotal lock member which includes a portion closely overlying the upper surface of the ball socket with a padlock assembly securing the lock member in locking position. A lock guard is provided to protect the padlock assembly by preventing easy access to the padlock assembly by bolt cutters or other similar cutting implements.

10 Claims, 2 Drawing Sheets

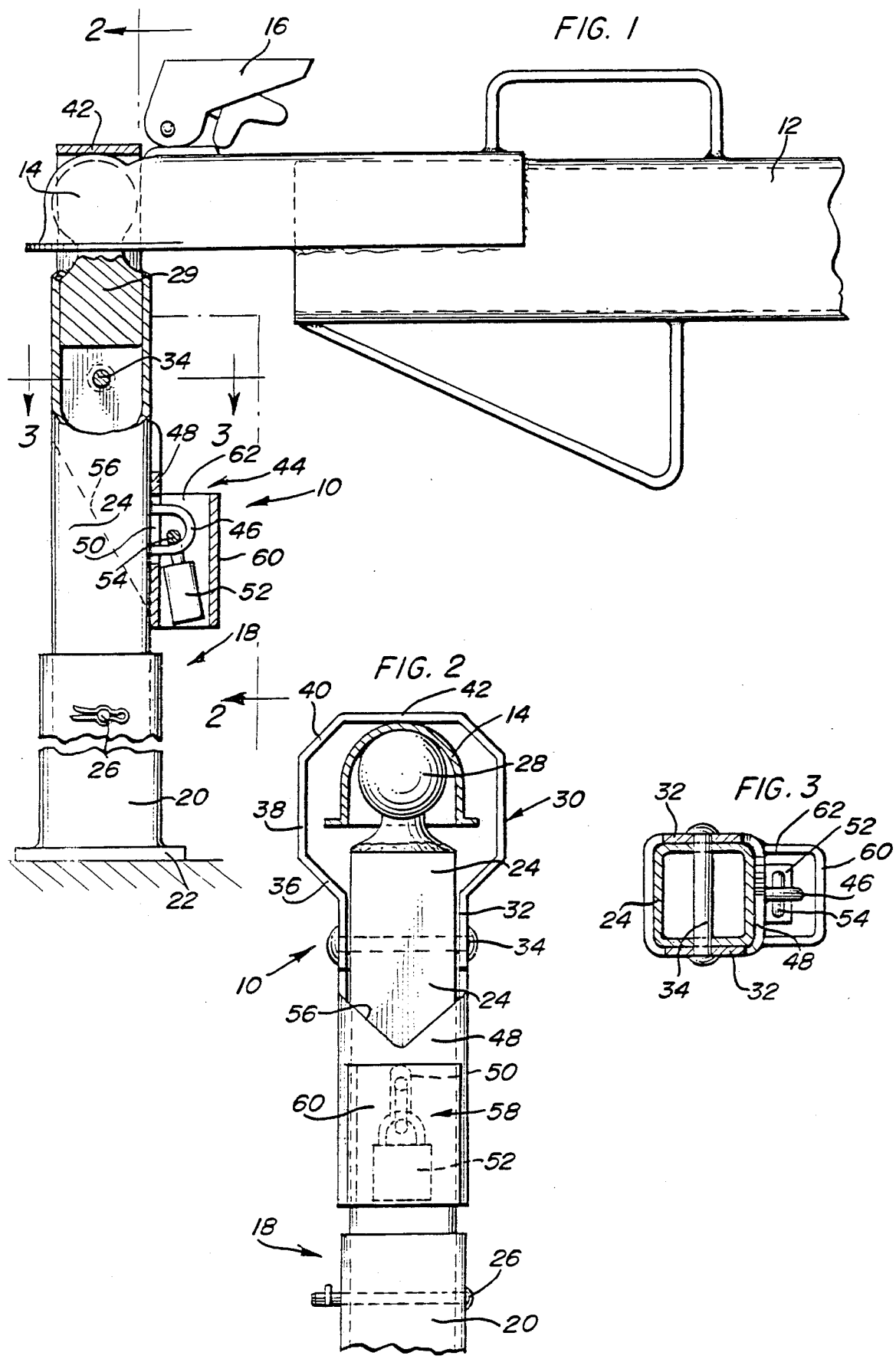

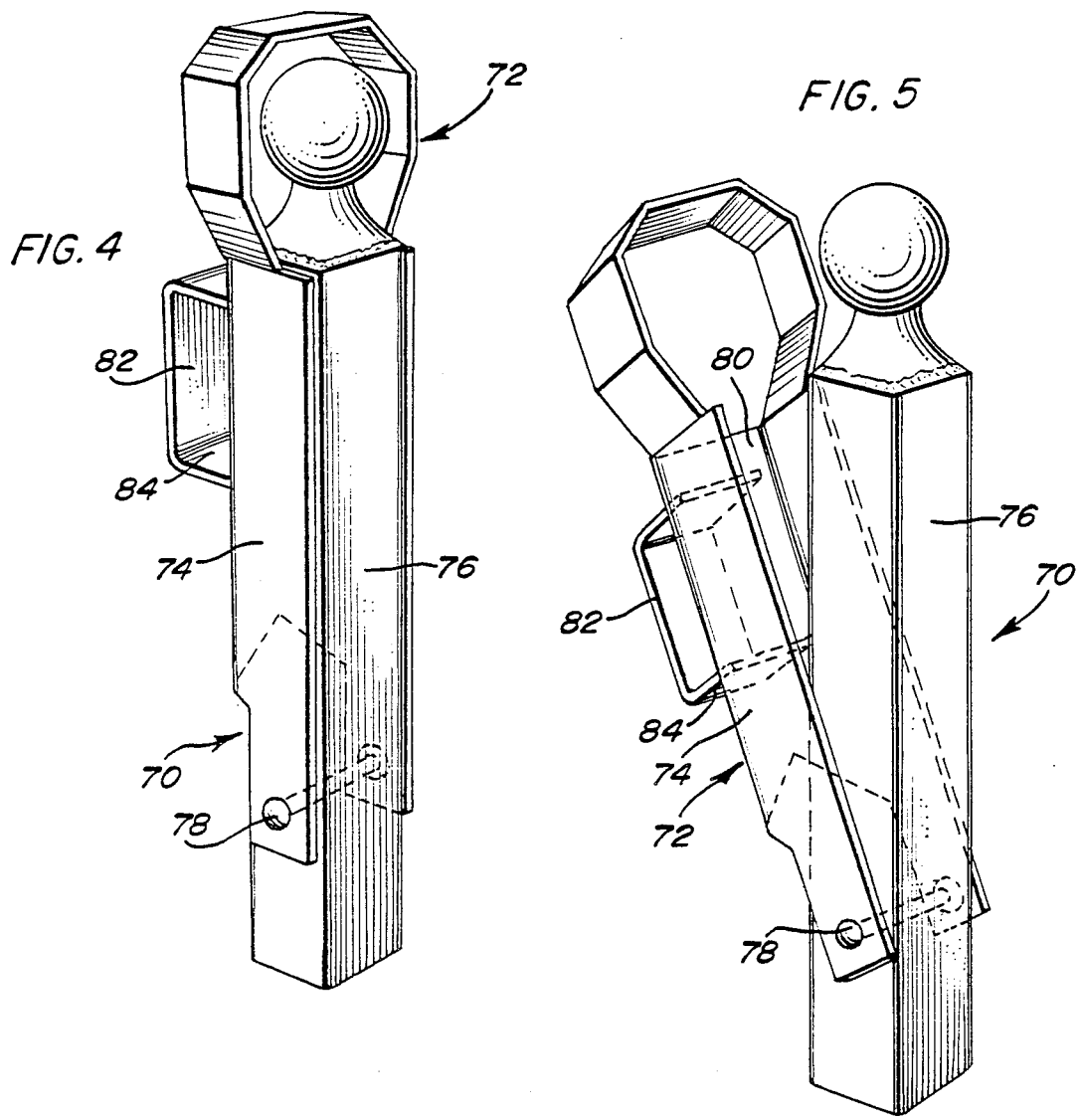

TRAILER LOCK

BACKGROUND OF THE INVENTION

1. FIELD OF THE INVENTION

The present invention generally relates to a trailer lock and more specifically to an anti-theft device for use with boat trailers or other trailers having a tongue with a ball socket thereon for engagement with a hitch ball connected to a towing vehicle. The lock includes a hitch ball mounted on top of a vertically adjustable support stand with the ball being received in the ball socket on the trailer tongue. The support stand includes a pivotal lock member which includes a portion closely overlying the upper surface of the ball socket with a padlock assembly securing the lock member in locking position. A lock guard is provided to protect the padlock assembly by preventing easy access to the padlock assembly by bolt cutters or other similar cutting implements.

INFORMATION DISCLOSURE STATEMENT

Various arrangements have been provided to prevent trailer theft by insertion of a ball into the ball socket on the tongue of the trailer so that a hitch ball on a towing vehicle cannot be connected to the ball socket on the tongue of the trailer. However, none of the prior art discloses the particular structure of the supporting stand, hitch ball, locking member and padlock assembly incorporated into this invention nor does the prior art disclose the guard for the padlock assembly of this invention. A separate information disclosure statement will be filed.

SUMMARY OF THE INVENTION

An object of the present invention is to provide a lock for trailers having a ball socket at the forward end of a tongue which includes a hitch ball insertable into the ball socket in a conventional manner with the hitch ball being supported from the upper end of a vertically adjustable support stand together with a movable lock member mounted on the support stand and movable into a position closely overlying the upper surface of the ball socket on the trailer tongue to retain the hitch ball in the ball socket thus preventing a hitch ball mounted on a towing vehicle from being engaged with the ball socket on the tongue of the trailer for preventing theft of the trailer which usually occurs when a towing vehicle with a hitch ball is connected to the ball socket assembly at the forward end of the tongue on the trailer with the trailer subsequently being towed to another location.

Another object of the invention is to provide a trailer lock in accordance with the preceding object in which the movable lock member is pivotally mounted on the vertically adjustable support stand with a padlock assembly interconnecting the lock member and support stand to retain the lock member in locking position with a portion thereof closely overlying the upper surface of the ball socket when the hitch ball on the upper end of the support stand is received in the ball socket thereby preventing a hitch ball on a towing vehicle from entering the ball socket on the tongue of the trailer.

A further object of the invention is to provide a trailer lock in accordance with the preceding objects in which the padlock assembly is provided with a guard associated therewith in a manner to prevent bolt cutters or other cutting instruments from having easy access to the padlock assembly thereby enhancing the anti-theft characteristics of the lock.

Still another object of the invention is to provide a trailer lock in accordance with the preceding objects in which the padlock assembly includes the staple or U-shaped loop of a hasp which extends through a slot formed in a portion of the lock member with a padlock connected to the staple and the guard being in the form of a plate overlying the hasp and a portion of the padlock with the entire structure being relatively simple in construction, easily connected to the ball socket on a trailer tongue and effective for preventing theft of the trailer when connected thereto.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view, with portions in section, of the trailer lock of the present invention illustrating its association with the ball socket on the forward end of a trailer tongue.

FIG. 2 is a vertical sectional view taken along section line 2—2 on FIG. 1 illustrating further structural details of the invention.

FIG. 3 is a transverse, sectional view taken along section line 3—3 on FIG. 1 illustrating the structural details of the pivotal connection between the lock member and support stand.

FIG. 4 is a perspective view of another embodiment of the invention.

FIG. 5 is a perspective view of the embodiment of FIG. 4 illustrating the lock member in unlocked position.

DESCRIPTION OF THE PREFERRED EMBODIMENTS

Referring now specifically to the embodiment of the invention illustrated in FIGS. 1-3, the trailer lock of the present invention is generally designated by numeral 10 and is illustrated in association with a conventional trailer tongue 12 having a ball socket 14 with latch assembly 16 at the front end thereof. This structure is conventional and the ball socket 14 is normally connected to a hitch ball on a towing vehicle (not shown) with the latch assembly 16 securing the ball socket 14 to the hitch ball for connecting the tongue 12 of the trailer to a towing vehicle in a conventional and well-known manner. The details of the ball socket and latch assembly 16 are not illustrated since they are conventional and well-known in the art.

The trailer lock 10 of the present invention includes a supporting stand 18 that includes a vertical tubular member 20 provided with a base 22 for engaging a support surface with the tubular member 20 telescopingly and vertically adjustably receiving an upper tubular member 24 with a bolt or other fastening device 26 securing the tubular members 20 and 24 in adjusted position to vary the height of the support stand 18. The upper end of the upper tubular member 24 is provided with a hitch ball 28 having a mounting portion 29 telescopingly and rigidly secured into the upper end of the tubular member 24 with the hitch ball 28 being received in the ball socket 14 in exactly the same manner as a hitch ball on a towing vehicle would be received in the ball socket 14. Thus, the support stand 18 supports the forward end of the trailer tongue 12 in a generally horizontal attitude so that the trailer tongue 12 will be oriented for easy connection with a hitch ball on a towing vehicle when a person authorized to connect to the trailer removes the support stand 18 and hitch ball 28 and connects the trailer tongue 12 to the hitch ball on a towing vehicle.

The support stand 18 has a lock member 30 mounted thereon with the lock member 30 including a pair of metal straps 32 generally oriented in parallel relation to each other in straddling relation to the upper end of the tubular member 24 and pivotally secured thereto by a pivot member 34 which extends through the straps 32 and the tubular member 24 and is in the form of a rod or bolt structure having the ends thereof riveted over to prevent removal so that the lock member is permanently and pivotally secured to the upper end of the tubular member 24. The upper end portions of each of the parallel straps 32 include an outwardly inclined portion 36 which is integral with strap portion 38 which is laterally outwardly offset in relation to the strap 32 in order to straddle the ball socket 14 as illustrated in FIG. 2. The outer ends of the parallel portions 38 have inwardly converging portions 40 terminating in a horizontal portion 42 that is perpendicular to the straps 32 and parallel portions 38 so that the horizontal portion 42 will closely overlie the upper surface of the ball socket 14 when in the locked position with the straps 32 and parallel portions 38 aligned with the tubular member 24 as illustrated in FIGS. 1 and 2. Thus, with the hitch ball 28 received in the ball socket 14 and the lock member 30 pivoted to the position illustrated in FIGS. 1 and 2 with the horizontal member 42 closely overlying the upper surface of the ball socket 14, the ball 28 will be retained in the ball socket 14 thereby preventing entry of a hitch ball on a towing vehicle into the ball socket 14.

In order to releasably retain the lock member in locked position, a padlock assembly 44 interconnects the tubular member 24 and the pivotal straps 32 with the padlock assembly including a U-shaped loop or staple 46 rigidly affixed to the tubular member 24 as by welding or the like on a surface of the tubular member 24 which is parallel to the axis of the pivot member 34. The lower end portions of the straps 32 are interconnected by a plate 48 along the edges of the straps below the pivot member 34 with the plate 48 including a slot 50 which receives the staple 46 when the lock member 30 is pivoted to a position in alignment with the tubular member 24. A padlock 52 includes a shackle 54 extending through the staple 46 to secure the plate 48 against the surface of the tubular member 24 as illustrated in FIG. 1 to retain the lock member 30 in its locked position with the horizontal member 42 closely overlying the upper surface of the ball socket 14 and being in alignment with the hitch ball 28 and tubular member 24 as illustrated in FIGS. 1 and 2. The lower ends of the straps 32 and the upper edge of plate 48 are inclined at 56 which tend to make it more difficult to insert a pry tool between the lower ends of the straps 32 or the top edge of plate 48 and the adjacent surfaces of the tubular member 24. The downward extension of the straps 32 also reinforces the plate 48 through most of its vertical length.

A lock guard generally designated by numeral 58 and which includes a plate 60 paralleling and spaced from the plate 48 with the plate 60 including two parallel legs 62 rigid therewith which straddle the padlock assembly 44 and are rigidly affixed to the plate 48 as by welding or the like. The lock guard 58 prevents direct and easy access of bolt cutters or similar cutting instruments to the padlock assembly thereby enhancing the anti-theft characteristics of the device.

Referring now to FIGS. 4 and 5 of the drawings, the embodiment of the lock device disclosed therein is generally designated by reference numeral 70 and is quite similar to lock 10 in functional relationship to the ball socket on the trailer tongue. In this embodiment of the invention, a lock member 72 includes a pair of side straps 74 which straddle an upper tubular member 76 and are pivotally connected thereto by a pivot member 78 adjacent the lower end thereof. The straps 74 are interconnected by a strap 80 of shorter length than the straps 74 which permit the lock member 72 to pivot out of alignment with the tubular member 76 as illustrated in FIG. 5 so that the lock member 72 will be disposed forwardly of the forward end of the ball socket which is the unlocked position of the lock member 72. The strap 80 is provided with a slot which receives a staple or loop on the tubular member 76 in a manner similar to that illustrated in FIGS. 1-3 and a lock guard plate 82 having upper and lower legs 84 is rigidly affixed to the strap 80 which functions in the same manner as the lock guard 58 in FIGS. 1-3, that is, it protects the padlock assembly from being easily engaged by bolt cutters or other cutting implements with the access to the padlock assembly being from the sides of the guard in FIGS. 4 and 5 and from the top and bottom of the guard in FIGS. 1-3.

In each embodiment of the invention, the hitch ball is of a standard size such as $1\frac{7}{8}''$ or $2''$ in diameter and the device prevents theft of the trailer once it is connected to the ball socket and locked in position since it is extremely difficult to remove and would require considerable time in cutting the locking device so that it could be removed which is a deterrent to a person intending to gain unauthorized possession of the trailer by connecting a towing vehicle to a trailer and towing the trailer away. While the anti-theft device is primarily intended for use with boat trailers, campers and similar trailers, it can be used with any type of trailer structure utilizing a ball and socket-type towing hitch. The pivotal lock member and the padlock assembly together with the guard for the padlock assembly welded to the pivotal lock member makes it very difficult to get bolt cutters or any other quick acting cutting device to the padlock. The adjustable support stand serves the purpose of supporting a certain amount of tongue weight that exists on every trailer and can be adjusted to the height of the towing vehicle normally used with the trailer thereby eliminating much lifting of the trailer tongue with the stand also functioning to adjust the trailer tongue to a higher elevation which, when used with a boat trailer, would keep the bow of the boat at an elevated position so that any rain water going into the boat would drain to the back and out through the normally provided drain hole in the boat hull. The lock device is completely portable and is quite compact for ease of storage when travelling. The device may be constructed of conventional materials and has sufficient strength and rigidity to provide stable and secure support to the trailer tongue and also provide an effective anti-theft device.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A trailer lock comprising a support stand having a hitch ball at the upper end thereof adapted to be inserted in a ball socket at the forward end of a trailer tongue in lieu of a hitch ball attached to a towing vehicle thereby preventing the hitch ball attached to a towing vehicle from entering the ball socket when the trailer lock hitch ball is positioned therein, a lock member movably connected to said stand and movable from a locked position adjacent to the ball socket to prevent disconnection of the hitch ball on the stand from the ball socket to an unlocked position spaced from the ball socket to permit the hitch ball on the support stand to enter and be removed from the ball socket, a padlock assembly releasably securing the lock member in locked position, and means affixed to said lock member preventing easy access to the padlock assembly by bolt cutters and the like.

2. A trailer lock comprising a support stand having a hitch ball at the upper end thereof adapted to be inserted in a ball socket at the forward end of a trailer tongue in lieu of a hitch ball attached to a towing vehicle thereby preventing the hitch ball attached to a towing vehicle from entering the ball socket when the trailer lock hitch ball is positioned therein, a lock member movably connected to said stand and movable from a locked position adjacent to the ball socket to prevent disconnection of the hitch ball on the stand from the ball socket to an unlocked position spaced from the ball socket to permit the hitch ball on the support stand to enter and be removed from the ball socket, and a padlock assembly releasably securing the lock member in locked position, wherein said lock member is pivotally mounted on the upper end portion of said support stand and is of generally U-shaped configuration with a pair of generally parallel straps extending alongside the support stand in straddling relation and being pivotally connected thereto by a pivot member, the web portion of the U-shaped lock member extending above and closely adjacent the upper surface of the ball socket when in locked position to prevent upward movement of the ball socket in relation to the hitch ball on the upper end of the stand when the lock member is in locked position thereby securing the hitch ball and stand to the trailer tongue.

3. The structure as defined in claim 2 wherein said padlock assembly includes a plate interconnecting the lower ends of said straps and lying alongside the support stand with the plate including a slot, a U-shaped staple rigidly affixed to the support stand and extending through the slot when the lock member is in locked position, a padlock having a shackle engaged with the staple to retain the plate against the support stand and retain the lock member in locked position.

4. The structure as defined in claim 3 together with a lock guard associated with the padlock assembly to prevent easy access thereto by bolt cutters and the like.

5. The structure as defined in claim 4 wherein said guard is in the form of a plate spaced from and overlying the padlock, slot and staple to prevent access to these components by bolt cutters or similar cutting implements.

6. The structure as defined in claim 5 wherein said plate forming the lock guard is horizontally oriented to provide access at the top and bottom edges thereof.

7. The structure as defined in claim 5 wherein said plate forming the lock guard is vertically oriented to provide access at the vertical side edges thereof.

8. In combination, a trailer tongue having a downwardly opening ball socket at its forward end adapted to receive a hitch ball mounted on a towing vehicle for articulately connecting a trailer and towing vehicle and a trailer lock comprising a support stand having a hitch ball on the upper end thereof received in the ball socket on the trailer tongue in lieu of the hitch ball on a towing vehicle thereby preventing a towing vehicle from being connected to the trailer tongue, said trailer lock also including a pivotal lock member mounted on said stand and having a transverse member extending above and closely adjacent the upper surface of the ball socket when in locked position to prevent the ball socket from being separated from the hitch ball on the stand, and lock means releasably retaining said lock member in locked position, wherein said lock member includes a pair of straps, said transverse member interconnecting said straps at one end thereof, the intermediate portion of said straps straddling said stand and being pivotally connected thereto by a transverse pivot member, the other ends of said straps being interconnected by a plate disposed adjacent the stand when the lock member is in locked position.

9. The combination as defined in claim 8 wherein said lock means includes a loop-type anchor rigidly affixed to said stand and projecting therefrom, said plate having a slot receiving said anchor when the lock member is in locked position, and a padlock having a shackle extending through the anchor outwardly of the plate to retain the lock member in locked position.

10. The combination as defined in claim 9 together with a guard plate rigidly secured to said slotted plate in overlying spaced relation to the anchor and padlock to render the anchor and padlock inaccessible to bolt cutters and similar cutting instruments.

* * * * *